United States Patent [19]

Knight

[11] 4,416,456

[45] Nov. 22, 1983

[54] TROLLEYS FOR TARGET RANGES

[75] Inventor: Lindsay C. Knight, Albury, Australia

[73] Assignee: Australasian Training Aids Pty. Ltd., Albury, Australia

[21] Appl. No.: 258,053

[22] Filed: Apr. 28, 1981

Related U.S. Application Data

[63] Continuation-in-part of Ser. No. 967,770, Dec. 8, 1978.

[51] Int. Cl.³ .................. F41J 9/02; B61B 13/06; E01B 25/10
[52] U.S. Cl. .................. 273/359; 104/120; 104/244; 105/96.2; 188/42; 188/44; 188/170
[58] Field of Search .................. 273/359, 366–370; 104/120, 121, 118, 154, 242, 244, 246, 245, 247; 105/63, 64 R, 96, 96.2, 133, 136; 361/212, 216, 217, 221; 152/DIG. 2; 180/308; 188/38, 41–44, 170

[56] References Cited

U.S. PATENT DOCUMENTS

| | | | |
|---|---|---|---|
| 368,315 | 8/1887 | Bathrick | 361/221 X |
| 2,108,059 | 2/1938 | Glasner | 188/170 X |
| 2,461,116 | 2/1949 | Jeffrey | 180/308 X |
| 2,489,740 | 11/1949 | Bilger | 188/42 |
| 2,530,720 | 11/1950 | Paulson | 180/308 X |
| 2,875,871 | 3/1959 | Govan et al. | 105/96.2 X |
| 2,980,193 | 4/1961 | Baudhuin et al. | 180/308 X |
| 3,012,519 | 12/1961 | Bingham | 104/120 |
| 3,096,854 | 7/1963 | Price et al. | 188/42 |
| 3,557,707 | 1/1971 | Joy | 105/136 X |
| 3,881,427 | 5/1975 | Blume | 104/120 X |
| 4,069,886 | 1/1978 | Campbell et al. | 180/308 |
| 4,234,060 | 11/1980 | Barsted | 188/170 X |

FOREIGN PATENT DOCUMENTS

| | | | |
|---|---|---|---|
| 706293 | 3/1965 | Canada | 104/120 |
| 1055722 | 10/1953 | France | 105/96.2 |
| 1479123 | 3/1967 | France | 188/43 |
| 848371 | 9/1960 | United Kingdom | 361/216 |
| 896154 | 5/1962 | United Kingdom . | |
| 946570 | 1/1964 | United Kingdom . | |
| 1367752 | 9/1974 | United Kingdom . | |
| 252386 | 2/1970 | U.S.S.R. | 104/120 |

OTHER PUBLICATIONS

Scientific American, 11-1941, p. 274, Auto Static.

Primary Examiner—Paul E. Shapiro
Attorney, Agent, or Firm—Schwartz, Jeffery, Schwaab, Mack, Blumenthal & Koch

[57] ABSTRACT

A trolley for moving along a mono-rail track comprising two superimposed tubes, the trolley being provided with means for carrying a target, and being further provided with pairs of drive wheels which are inwardly inclined to rest on upper parts of the lower tube forming the track, the pairs of drive wheels having a "V" configuration. Additional pairs of substantially horizontal wheels engage opposite sides of the lower tube below the drive wheels. The drive wheels are driven by individual hydraulic motors, connected in series, and the hydraulic circuit for controlling the motors can be operated to achieve a braking effect on the wheels. Jockey wheels engage the top tube of the track. An additional spring pressure applied, hydraulic pressure released brake acts on the upper tube.

17 Claims, 7 Drawing Figures

TROLLEYS FOR TARGET RANGES

CROSS-REFERENCE TO RELATED APPLICATION

This application is a continuation-in-part of my earlier application Ser. No. 967,770, filed Dec. 8, 1978 entitled "TROLLIES FOR TARGET RANGES."

BACKGROUND TO THE INVENTION

The invention relates as indicated to trolleys for target ranges, and to target ranges provided with such trolleys.

Trolleys which carry target mechanisms for moving targets, especially targets adapted to be moved from an inoperative or concealed position to an operative or exposed shooting position are known. One disadvantage with many such prior trolleys is that it is difficult to camouflage the track and the trolleys in such a way that the trolleys can move to "sneak-up" to a desired position before the target is moved to the operative or exposed shooting position, thereby simulating a surprise attack, without the shooter being able to anticipate where the target is likely to appear, or to conceal the combination of the track and the trolley so that when the target carried by the trolley is, for example, a representation of a tank, the tank appears to move realistically over the ground.

It has been proposed previously to provide a trolley that moves on a mono-rail type track, a trolley of this type being described in British patent specification No. 1,367,752. The trolley described in that Specification is provided with a generally rectangular housing which is supported by two co-aligned drive wheels, one at each end of the housing, which rotate in a vertical plane, the drive wheels being mounted on the uppermost rail of a mono-rail type track which track comprises two rods or tubes which are parallel to one another and located one above the other, the rods or tubes being interconnected by vertical webs at spaced intervals. It will be appreciated that this type of track is relatively narrow and is thus easier to conceal than the conventional track formed of two parallel rails mounted on sleepers. The wheels that are mounted on top of the track are used to drive the trolley, and jockey wheels are provided which engage the lowermost rod or tube of the track to maintain the trolley in a vertical orientation.

Certain disadvantages have been experienced in connection with the trolley described in British patent specification No. 1,367,752. The wheels used to drive the trolley have been provided with a recess in the periphery thereof, so that a relatively large surface of the wheel contacts the tube. This has been found to be necessary to enable the trolley to move successfully along rails which are inclined to the horizontal, and rails which are wet or damp. Also, to improve the traction of the trolley the periphery of the driving wheels has been formed from a material having a high coefficient of friction to ensure that there is a good grip between the wheels and the track. It has been found that, as a result of this combination of features, if a trolley is caused to negotiate a bend in the track it is possible that the side edges of the recess formed in the drive wheels will engage the edge of the track, and instead of the trolley negotiating the bend the foremost drive wheel will ride up the track. This possibility arises since one side edge of the recess will engage the side of the track with a high co-efficient of friction, and the trolley will maintain its linear motion causing the wheel to ride up the track. Thus the trolley may become derailed. Although such de-railments are an infrequent occurrence, the possibility of such de-railments occurring is a disadvantage of the prior proposed trolley. De-railments of the type described above occur most frequently when the trolley is carrying a large erected target and a wind is blowing transversely to the direction of movement of the trolley, since the effect of the wind is to urge the drive wheels firmly into engagement with the rail, thus resisting the tendency of the trolley to turn when the track is curved. Thus, reduced speed specifications are necessary.

A further disadvantage of the apparatus described in British patent specification No. 1,367,752 results from locating the driving wheels above the uppermost rail. For example, the housing of the trolley extends for a substantial distance above the level of the uppermost rail of the mono-rail type track requiring relatively large earth banks or the like in order to conceal the trolley. Moreover, large diameter drive wheels which might otherwise increase top speed capabilities are not possible without increasing the overall height of the trolley housing. This is undesirable since it makes concealment of the trolley more difficult.

Another disadvantage of the trolley described in British patent specification No. 1,367,752 stems from the utilization of a single mechanical, friction-type braking system which operates only on the drive wheels. Since the braking action is not directly applied to the rail itself, there is no assistance in maintaining the vertical orientation of the trolley during braking so as to withstand the deleterious effects of sideways loading. Further, the components of the brake system experience considerable wear during operation and therefore require periodic maintenance and replacement. It has also been found that traction is lost if the wheels lock-up when braking the trolley along downwardly inclined rails, or rails that are damp or wet. As a result, the brake system described in the British reference is not particularly adapted for high speeds.

OBJECT OF THE INVENTION

The present invention seeks to provide a trolley for use on target ranges, and also seeks to provide a target range provided with a trolley, in which the above described disadvantages and drawbacks are obviated or reduced.

SUMMARY OF THE INVENTION

According to this invention there is provided a trolley adapted to run on a mono-rail track comprising two elongate members extending one above the other in spaced parallelism, the trolley comprising a chassis or the like provided with wheels adapted to engage the upper elongate member and the lower elongate member, first brake means for engaging one of the elongate members, and second brake means associated with at least certain of the wheels. The wheels are adapted to engage the upper elongate members comprise jockey wheels, and the wheels adapted to engage the lower of said elongate members comprise inwardly inclined wheels to support the weight of the trolley, the lower peripheries of the inwardly inclined wheels being closer to the vertical axis of the track than the upper peripheries of the wheels.

Advantageously are inclined wheels are provided in opposed pairs, each pair of wheels being of "V" configuration when viewed in elevation.

Preferably, drive means are associated with some, or advantageously all, of the wheels which engage the lower of the elongate members. The drive means may comprise individual hydraulic motors, the trolley carrying a pump and a motor to drive the pump, to provide hydraulic fluid under pressure to power the hydraulic motors.

Advantageously, control means may be provided to connect said individual motors and said pump in series to drive the driven wheels each at the same speed. The control means may adjust the connection of the motors and pump to provide a braking effect when necessary. Preferably, the trolley is fitted with two separate brake systems; a primary hydraulic brake system which operates on the carrier drive wheels, and a secondary brake system which operates on the monorail. In a preferred form, the secondary brake system includes a spring actuated, hydraulically released brake shoe assembly which engages the monorail.

Preferably, the periphery of each of the wheels adapted to engage the lowermost elongate member is provided with a rim of polyurethane or other material having a high co-efficient of friction. Also, the periphery of each wheel is preferably recessed to provide a relatively large area of contact between the wheels and the lowermost elongate member. Preferably means are provided for discharging any static electricity accumulating on any such rim.

The jockey wheels may be adapted to rotate in a horizontal plane, and in such a case the peripheries of the jockey wheels may advantageously be notched so that the jockey wheels firmly engage the uppermost elongate member horizontally; alternatively, the jockey wheels may be adapted to rotate at an incline to the horizontal, the lower peripheries of the wheels being closer to the vertical axis of the track, than are the upper peripheries.

The trolley is provided with means for supporting a target, which means may be adapted to raise or lower the target in response to radio control signals or in response to the target being hit by a trainee marksman. Preferably, transducer means are provided to sense when the target is hit, and radio control or other such control means are provided to facilitate the controlling of movements of the trolley.

This invention also relates to the combination of such trolley and a track, and to a range provided with such trolleys.

Preferably the lowermost of the two elongate members constituting the track is of greater diameter than the uppermost member thereof.

BRIEF DESCRIPTIONS OF DRAWINGS

In order that the invention may be more readily understood, and so that further features thereof may be appreciated, the invention will not be described by way of example, with reference to the accompanying drawings, in which.

DESCRIPTIVE OF PREFERRED EMBODIMENTS

Figure 1:
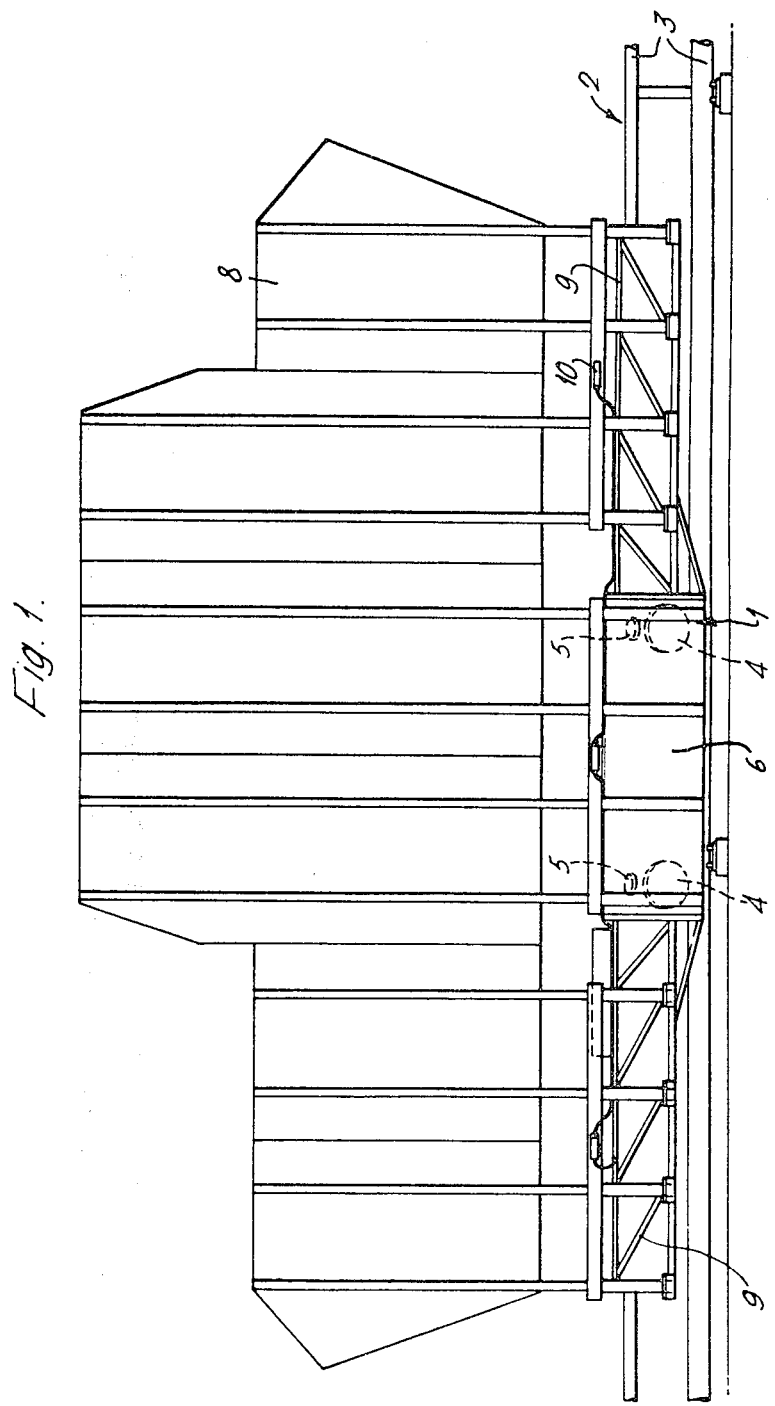
FIG. 1 is a front elevational view of a trolley according to the invention located on a track.
Figure 2:
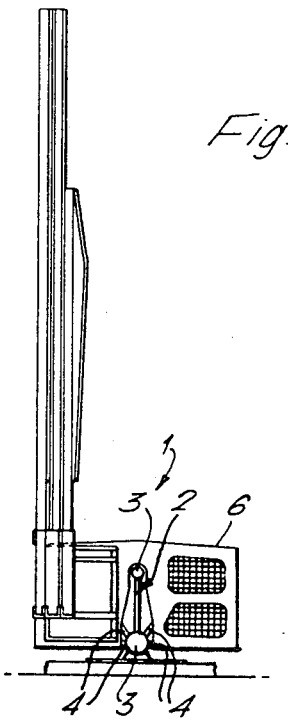
FIG. 2 is an end elevational view of the trolley of FIG. 1.

A trolley 1 in accordance with the present invention as shown in FIGS. 1 and 2 is adapted to run on a monorail track 2, the mono-rail track comprising two parallel tubes 3 superimposed one above the other, the tubes being interconnected at regular intervals by vertical webs and, if desired, by inclined reinforcing webs (not shown). As shown, the lowermost tube 3 is of a greater diameter than the uppermost tube 3, thus being of greater strength than the uppermost tube.

The mono-rail track 2 may be mounted in a desired position on a shooting range. The shooting range is to be used for training personnel in marksmanship. The mono-rail track 2 is concealed from the shooting point on the range by means of earth banks or the like (not shown).

One or more trolleys 1 are mounted for movement on the mono-rail track, and one of these trolleys 1 will now be described.

The trolley 1 comprises a chassis or framework, the chassis or framework supporting a motor or the like for powering the trolley, drive wheels 4 for engaging one of the tubes 3 of the mono-rail track 2 for driving the trolley along and for supporting the weight of the trolley, and jockey wheels 5 for engaging the other of the tubes to maintain the stability of the trolley. The chassis supports a housing or cover 6 which conceals the chassis and motor. The chassis comprises an uppermost horizontal member that passes over the top of the uppermost tube, but which is only spaced from the uppermost tube by a short distance. The chassis also supports the jockey wheels 5 which in the form shown in FIG. 3, rotate about an axis which is inclined to the vertical, the upper peripheries of the jockey wheels engaging the upper tube 3 and the lower peripheries being spaced therefrom. This is the arrangement shown in FIGS. 1 to 3, and it will be appreciated that the wheels 5 engage substantially opposite sides of the top tube 3 of the mono-rail track 2 to act as jockey or guide wheels. In an alternative arrangement shown in FIG. 4, horizontal jockey wheels 7 are provided instead of the inclined wheels 5. The wheels 5 are provided with deep "V" notches in the periphery thereof to ensure that the wheels 7 firmly engage the uppermost tube 3, the jockey wheels being in opposed pairs.

Figure 3A:
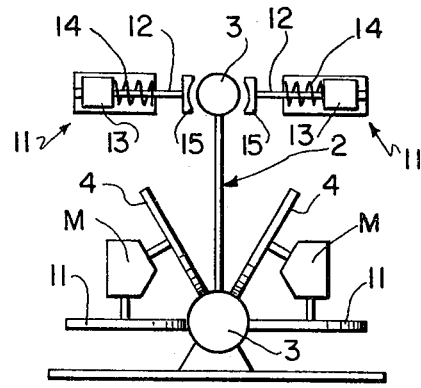
FIG. 3A is a view similar to FIG. 3, with the upper, jockey wheels being removed so as to illustrate schematically portions of the secondary brake system.

The chassis also supports a pair of mono-rail contacting braking assemblies 11, located opposite each other, and shown partially schematically in FIG. 3A. In this figure, the jockey wheels have been omitted so as to illustrate with more clarity the assemblies 11. It will be understood that the assemblies are positioned on the chassis longitudinally spaced relative to the jockey wheels, and the assemblies are preferably horizontally arranged so as to more effectively engage the mono-rail for braking action and at the same time not increase the overall height of the chassis. It will further be understood that the secondary braking system including the assemblies 11 is utilized with the FIG. 4 trolley form as well.

Each assembly 11 comprises a piston rod 12, a cylinder 13, a disc spring stack 14 and a brake shoe 15, the curvature of which complements the curvature of the periphery of the upper tube 3. Both assemblies 11 act on the top rail 3 of the mono-rail structure and are applied by spring pressure when the trolley 1 is braked or stationary. The detailed structure and the monorail-contacting brake assemblies 11 will be described in more detail when specific reference is made to FIGS. 5 and 6.

The housing 6 includes two downwardly depending housing parts which extend downwardly on either side of the mono-rail, and these housing parts contain the various components carried by the trolley. A pair of drive wheels 4 are provided at each end of the trolley and engage the uppermost part of the lowermost tube 3 of the mono-rail track 2, the drive wheels 4 each being inclined to the vertical so that the drive wheels of each pair are inwardly inclined at their lower peripheries. The arrangement is such that when viewed in elevation the drive wheels appear to have a "V" configuration. Thus, each drive wheel runs along a part of the lowermost tube 3 of the mono-rail track 2 which is adjacent the region of that lowermost tube provided with the vertical webs supporting the uppermost tube.

Each driving wheel 4 is associated with a hydraulic motor which is adapted to drive the wheel in question, and the hydraulic motors are all provided with hydraulic fluid from a single central hydraulic pump which is operated, for example, by a petrol or electric motor, with both the pump and the motor being carried on the trolley. The arrangement is such that when the trolley is to move forwardly the hydraulic fluid is provided to the hydraulic motors in series, and thus all of the hydraulic motors will operate at precisely the same speed. The hydraulic motors are also utilized to provide a braking effect by retarding the flow of hydraulic fluid through the hydraulic motors.

Figure 5:
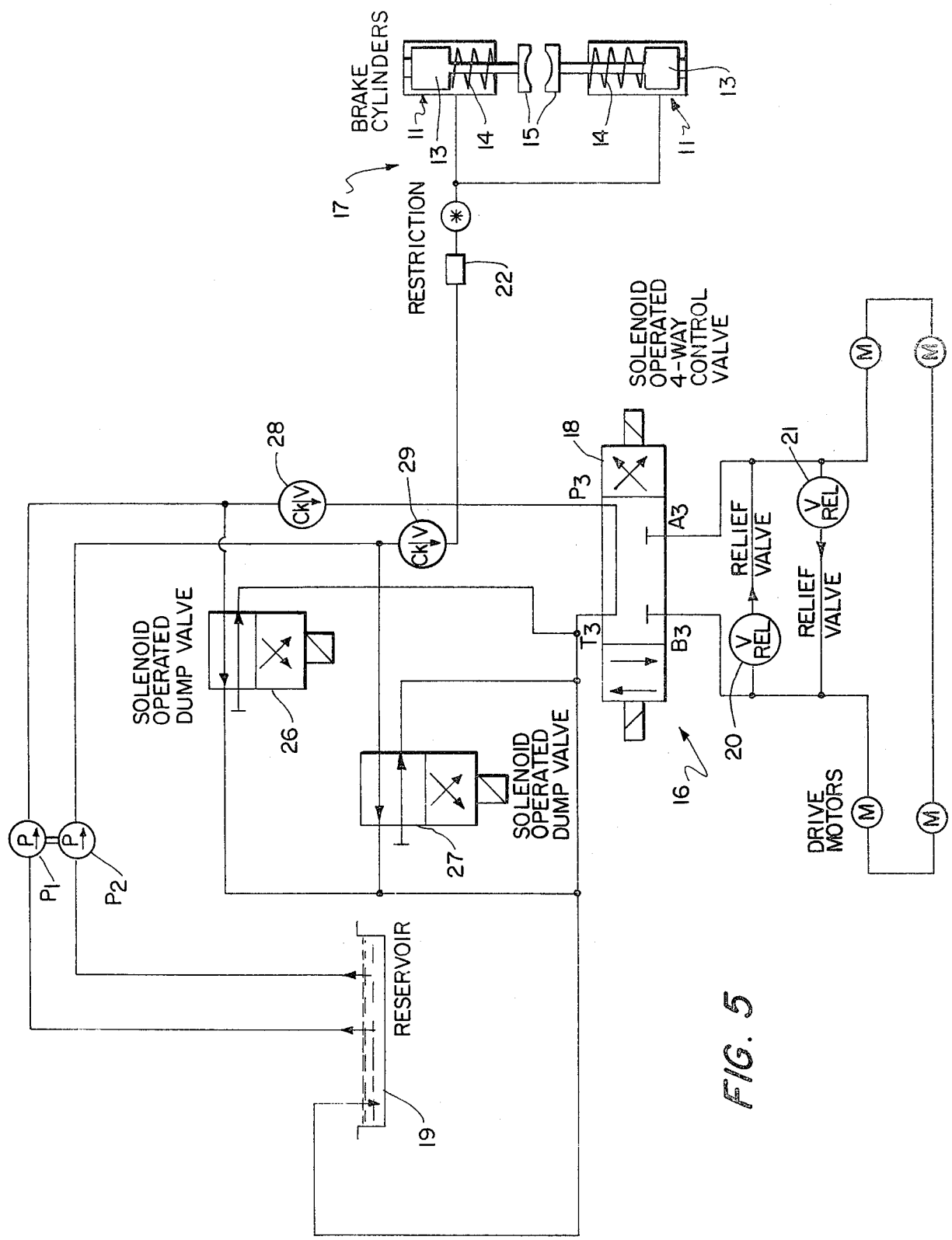
FIG. 5 is a schematic diagram illustrating the hydraulic system which operates the braking systems of the present invention.

Referring to FIG. 5, a hydraulic system is illustrated for operating the primary braking system, generally indicated at 16, and the secondary braking system, generally indicated at 17. The primary braking system 16 serves to brake the trolley driving wheels 4 and operates as follows. Upon receipt of a STOP or reverse direction command, the 4-way hydraulic control valve 18 and the inlet valves to the pumps $P_1$ and $P_2$ are closed. The hydraulic drive motors M are therefore isolated from pumps $P_1$ and $P_2$. As a result, the hydraulic fluid from the pumps $P_1$ and $P_2$ is directly passed to a reservoir 19, and drive motors M and relief valves 20 and 21 form a closed loop. The trolley wheels, which are still moving, therefore drive the hydraulic motors M as pumps. The hydraulic fluid contained in the closed loop is pumped across relief valves 20 and 21, and since the relief valves restrict the flow of hydraulic fluid, a braking effect is produced.

The secondary braking system 17 is a spring actuated hydraulically released system which operates on the mono-rail and comprises the pair of mono-rail-contacting brake assemblies 11. When the trolley is at rest and the petrol engine running at normal rpm, the solenoids of valves 26 and 27 are not energized and there is no restriction of the flow of oil from both pumps $P_1$ and $P_2$. At this time, the system oil pressure is low and the secondary braking system is applied to the top tube 3 by spring pressure. When a movement command is selected, valve 26 is energized and the system pressure rises quickly.

When a movement command is selected, the pressure in the hydraulic system rises rapidly and overcomes the brake spring pressure so that the brake shoes 15 are retracted. Allowing the carrier to move in either direction.

Upon receipt of a STOP command, the solenoids of valves 26 and 27 are deenergized, and the pressure in the hydraulic system falls rapidly so that the spring pressure of springs 14 overrides the hydraulic pressure and the brake shoes 15 apply a clamp to the top of the mono-rail. When the trolley is at rest, the hydraulic pressure of the hydraulic system is low and the brake shoes 15 are firmly applied to the top of the mono-rail by spring pressure.

A nipple adapter 22, shown schematically in FIG. 5, contains a restriction and is fitted to the brake hose connector to ensure progressive secondary braking. Non-return valves 28 and 29 are provided to prevent back flow from pump $P_1$ and $P_2$, and vice-versa. Although the secondary braking action is applied to the top mono-rail, it is understood that the braking action could be applied to the bottom rail, or both top and bottom rails. The various valving elements shown in FIG. 5 are commercially avalable and per se form no part of the present invention. They have accordingly been shown only schematically in FIG. 5.

Figure 6:
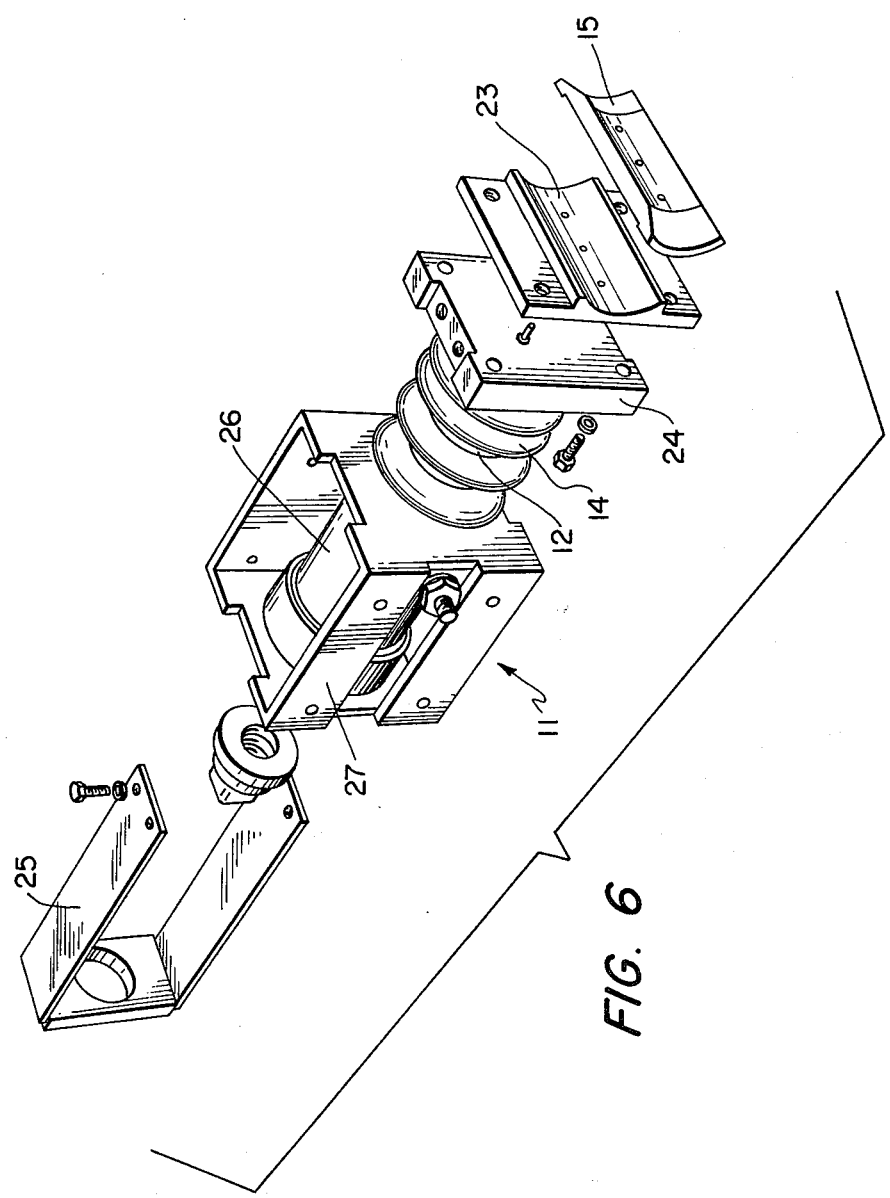
FIG. 6 is an exploded, perspective view of the spring actuated braking system which operates on the monorail.

Referring to FIG. 6, each brake assembly 11 comprises the brake shoe 15, formed of any suitable material and attached by screws or the like to a plate 23 and a block 24. A guide 25 engages notches in the block 24 to ensure linear movement. The block 24 is connected to a hydraulic cylinder 26, which is commercially available and per se forms no part of the present invention, through rod 12 by means of which the shoe 15 can be retracted towards the cylinder 26. A coil spring or a plurality of disc springs 14, or comparable spring material is positioned around the rod and between the block 24 and a cylinder bracket 27 and urges the brake shoe 15 towards the mono-rail (FIG. 3A) and away from the cylinder 26. The hydraulic lines to cylinder 26 are not shown for purposes of clarity.

The drive wheels 4 are provided with a rim or periphery formed of a material that will grip the lowermost tube, such as a rim or periphery of polyurethane, and this rim or periphery may be provided with a recess so that the drive wheel snugly engages the lowermost tube. A similar rim may be provided on the jockey wheels 5.

In a typical trolley two drive wheels 4 and two jockey wheels 5 or 7 are provided at each end of the trolley, and with this arrangement the trolley may be moved rapidly and with great stability due to the "V" configuration of the drive wheels 4, and the arrangement of the jockey wheels 5 or 7. As a result, the trolley will not tend to de-rail as it traverses corners. Furthermore, the uppermost surface of the trolley is only a very short distance above the top rail or tube 3 of the mono-rail track, and thus the earth banks or the like necessary to conceal the mono-rail and the trolley need not be as high as the earth banks provided to conceal the mono-rail and the trolley as described in prior British patent specification No. 1,367,752.

A trolley in accordance with the present invention and as described above, may be utilized to support a target which rises and falls in response to radio control signals, or in response to the target being hit by a trainee marksman. Thus the trolley may carry targets similar to the targets described in prior British patent specification No. 1,367,752. However, it is envisaged that a trolley in accordance with the present invention may be especially suitable for carrying large targets, such as targets resembling tanks and the like, and the trolley illustrated in FIGS. 1 and 2 is shown carrying a target 8 which resembles a tank. If a trolley is to be utilized for carrying such large targets it is envisaged that the large target 8 may be rigidly mounted on the top of the trolley, and if the trolley is of insufficient length to support the entire target, the trolley may be provided with trusses 9 extending from either end of the trolley to assist in the supporting of the target. Alternatively two or more trolleys may be connected together to form a train of trolleys with each trolley supporting part of the target. Preferably the parts of the target supported by each of the target carried by the other trolleys to facilitate cornering thereof.

If a train of trolleys is utilized it is conceivable that only one of the trolleys will be provided with means to drive the trolley along, the remaining trolleys have the same wheel configuration as described above, but may not have hydraulic motors or a petrol motor to drive the trolleys along.

It has been found that when the trolleys in accordance with the present invention support a 25 ft. target, a 20 m.p.h. wind produces a moment applied to the trolley about the lowermost tube of the mono-rail well in excess of 1 ft. ton. However, with the jockey wheels provided at the top of the trolley, and with the "V" configuration of the driving wheels, the trolley is able to withstand a sideways loading of this magnitude without any deleterious effects.

It is envisaged that a trolley in accordance with the present invention will be provided with a radio-control device to permit the direction and speed of movement of the trolley to be controlled, by radio, from a central console in response to the operation of a manually operated device by a range controller, or in response to a predetermined program. It is also preferred that means are mounted on the trolley for determining the position at which a bullet fired at the target actually impinges on the target, or for providing signals from which the position of impingment of the bullet on the target may be calculated. These signals are preferably transmitted to a central console by means of a radio link. Alternatively, or in addition, the trolley may be provided with a radio hit count device, that is to say, a device adapted to determine the number of bullets hitting a target carried by the trolley, and to relay that count, by a radio link, to a central console or the like. Transducers 10 are provided to detect shock waves generated when a projectile impinges on target 8 to provide signals for the radio hit count. While specific reference has been made to the provisions of one or more radio links, it will be appreciated that these links may be replaced by permanent line connections if preferred.

Additionally, a trolley in accordance with the present invention may be provided with means to sense the close proximity of another trolley or the close proximity of the end of the track, the sensing means being connected to a control device adapted to cause the direction of rotation of the drive wheels to be reversed. Thus collisions between trolleys, and between trolleys and the end of the track may be obviated.

If a polyurethane material is utilized as the rim of the driving wheels, it is possible for static electricity to build up on the rims of the wheels, possibly causing interference with any radio link. In order to obviate this problem it is preferred to provide metal brushes gently rubbing against the peripheries of the drive wheels or any other wheels provided with a polyurethane or other electrically insulating material rims, the brushes being connected to earth to discharge any accumulation of static electricity.

It is important to note that a trolley, as described above, has a low centre of gravity and is able to withstand substantial side loads, such as the side loads generated when the trolley is carrying a large target and is subjected to high wind. A substantial pressure is applied to the inwardly inclined driving wheels, thus enabling the trolley to turn smoothly, even if the track has a small radius of turning, or the trolley is subjected to a high side loading. The large radius of the lower tube and the shape of the peripheries of the drive wheels ensures that an adequate driving grip is provided between the drive wheels and the track.

Figure 3:
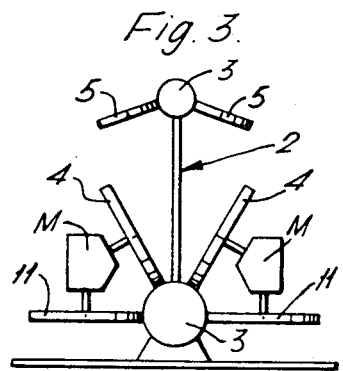
FIG. 3 is a schematic view illustrating one arrangement of the wheels of the trolley.
Figure 4:
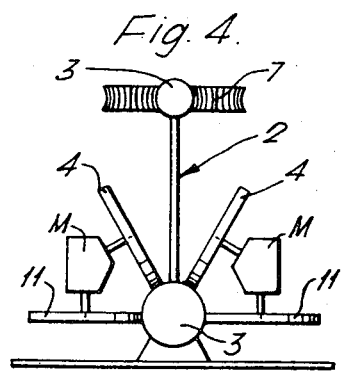
FIG. 4 is a corresponding schematic view of an alternative arrangement of wheels for the trolley.

While trolleys have been described which have two driven wheels 4 in contact with the lower horizontal tube, it has been found most advantageous to have an additional pair of driven wheels 41, driven by motors M, in contact with the lower tube 3, the wheels 41 being horizontal and contacting the tube 3 just below the horizontal diameter thereof. With such a wheel configuration, which is shown in FIGS. 3 and 4, even if a strong wind blows at least two driven wheels, and under normal circumstances at least three driven wheels, will be in contact with the lower tube 3 ensuring that the trolley proceeds smoothly.

The hydraulic system illustrated in FIG. 5 schematically illustrates the hydraulic for the braking and drive systems. The electrical controls for the operation of the trolley are not critical to the understanding of the concepts of the present invention, and have accordingly not been illustrated or described.

The advantages of the invention should be apparent from the above description. The trolley is uniquely supported on a mono-rail track so as to provide support for large, tank type targets even in conditions of substantial side loading and at relatively high levels of speed. The provision of primary and secondary braking systems permits rapid and complete stopping and reversal of direction of the trolley, an obvious advantage for optimum range design and flexibility.

I claim:

1. A trolley and a mono-rail track on which said trolley runs, said track comprising upper and lower elongate members extending one above the other in spaced parallelism, means for interconnecting said elongate members to provide a rigid track assembly, at least the lower elongate member having a periphery that is at least partially circular, said trolley comprising a chassis provided with an upper pair of jockey wheels which engage said upper elongate member on substantially opposite sides thereof and a lower pair of drive wheels which engage said lower elongate member, each of said lower pair of drive wheels being inclined upwardly and outwardly relative to said lower elongate member and serving to support the weight of the trolley, each of said lower drive wheels having a periphery which is concavely curved to provide intimate contact with the circular part of the periphery of said lower elongate member, the point of peripheral contact of said drive wheels being closer to the vertical axis of the track than the uppermost parts thereof, hydraulic motor means for driving said trolley, hydraulic circuit means for operating said hydraulic motor means, said hydraulic circuit means including means for controlling said motor means for braking effect, additional brake means adapted to engage at least said upper elongate member for further braking effect, and additional substantially horizontal wheels which engage side portions of said lower elongate member.

2. The trolley of claim 1 wherein the braking of said trolley effected by said hydraulic circuit is provided by control valve means the actuation of which isolates said hydraulic motors from hydraulic pumps therefor, and relief valves between said pumps and motors, the actuation of said control valve means shutting off flow of hydraulic fluid to said pumps and causing said fluid to be pumped across said relief valves thereby reducing fluid flow and producing a braking effect.

3. The trolley of claims 1 or 2 wherein said additional brake means comprises a spring actuated hydraulically released system including brake assemblies disposed adjacent to and on opposite sides of said upper elongate member, each brake assembly including a brake shoe adapted to engage said upper elongate member during braking action, a hydraulic cylinder including a piston rod operatively connected to said brake shoe, said hydraulic cylinder forming part of said hydraulic circuit means, and spring means interposed between said shoe and said cylinder and normally biasing said shoe into engagement with said elongate member, actuation of said cylinder retracting said shoe against the bias of said spring means, thereby releasing the brake for movement of the trolley.

4. A trolley according to claim 3, wherein said upper elongate member has a periphery that is at least partially circular, each of said upper pair of jockey wheels has a periphery which is concavely curved to provide intimate contact with said circular part of said upper elongate member, and wherein said lower elongate member is of greater diameter than said upper elongate member.

5. A trolley according to claim 3, wherein said jockey wheels are downwardly inclined to the horizontal from the point of contact thereof with said upper elongate member.

6. A trolley according to claims 1 or 2 wherein said upper elongate member has a periphery that is at least partially circular, each of said upper pair of jockey wheels has a periphery which is concavely curved to provide intimate contact with said circular part of said upper elongate member, and wherein said lower elongate member is of greater diameter than said upper elongate member.

7. A trolley according to claims 1 or 2 wherein said jockey wheels are downwardly inclined to the horizontal from the point of contact thereof with said upper elongate member.

8. A trolley according to claim 1 wherein said lower elongate member is of greater diameter than said upper elongate member.

9. A trolley according to claim 1 wherein hydraulic motor means are associated with all of said drive wheels which engage said lower elongate member.

10. A trolley according to claim 1 wherein said hydraulic motor means comprise individual hydraulic motors, the trolley carrying a pump, and a motor to drive the pump, to provide hydraulic fluid under pressue to power the hydraulic motors.

11. A trolley according to claim 1 wherein said hydraulic circuit means includes means to connect said individual motors and said pump in series to drive the driven wheels each at the same speed.

12. A trolley according to claim 1 wherein the periphery of each of said drive wheels is provided with a rim of material having a high coefficient of friction.

13. A trolley according to claim 12 wherein said material having a high coefficient of friction is polyurethane.

14. A trolley according to claim 1 wherein said jockey wheels are disposed and rotatable in a horizontal plane.

15. A trolley according to claim 1 further including means on said trolley for supporting a target.

16. A trolley according to claim 1 wherein said additional wheels are arranged in opposed pairs and are driven by said hydraulic motor means.

17. A trolley according to claim 16 wherein said additional horizontal wheels are positioned below said drive wheels thereby further stabilizing the trolley.

* * * * *